United States Patent [19]

Goodall

[11] 4,328,494
[45] May 4, 1982

[54] DIGITAL DATA LINK FOR TRUCK WEIGHING APPLICATIONS

[76] Inventor: Richard Goodall, 3312 - 38th Ave. West, Seattle, Wash. 98199

[21] Appl. No.: 106,838

[22] Filed: Dec. 26, 1979

[51] Int. Cl.³ ............................................. G08C 19/16
[52] U.S. Cl. ............................... 340/870.18; 177/136; 177/DIG. 10; 340/52 R; 340/870.04
[58] Field of Search ............. 340/207 R, 207 P, 58 R, 340/58 F, 310 R, 538, 208, 209, 666, 201 R, 203, 347 M, 870.18, 870.25, 870.26, 870.04, 870.3, 870.16, 870.19; 177/136, DIG. 10, 210 R, 45; 364/567; 235/92 WT; 315/82; 307/10 R, 10 LS, 12, 42

[56] References Cited

U.S. PATENT DOCUMENTS

| | | | |
|---|---|---|---|
| 3,603,418 | 9/1971 | Schmidt et al. | 177/136 |
| 3,603,418 | 9/1971 | Schmidt et al. | 177/136 |
| 3,650,340 | 3/1972 | Bradley | 177/136 |
| 3,651,454 | 3/1972 | Venema et al. | 340/52 R |
| 3,701,279 | 10/1972 | Harris et al. | 177/136 |
| 3,793,636 | 2/1974 | Clark et al. | 340/207 R |
| 3,854,540 | 12/1974 | Holmstrom | 177/136 |
| 3,966,002 | 6/1976 | Schneider | 177/136 |
| 4,020,911 | 5/1977 | English et al. | 177/136 |
| 4,086,576 | 4/1978 | Jebb et al. | 340/52 R |
| 4,099,157 | 7/1978 | Enabnit | 340/538 |
| 4,108,262 | 8/1978 | Anderson | 340/52 R |
| 4,156,232 | 5/1979 | Blass | 340/52 F |

Primary Examiner—James J. Groody
Attorney, Agent, or Firm—Graybeal & Uhlir

[57] ABSTRACT

An apparatus for communicating a vehicle parameter to a location remote and apart from where the vehicle parameter is measured is disclosed. The apparatus comprises a sensor responsive to the parameter being measured, with the sensor producing an output analog signal proportional to the vehicle parameter being measured. The output analog signal is subsequently converted into a digital signal whereby the vehicle parameter being measured is represented by an N-bit digital code. The N-bit digital code is subsequently transmitted to a location remote and apart from where the vehicle parameter is being measured, and is converted into a continuous analog signal representing the vehicle parameter being measured. The analog signal is subsequently displayed in a viewer usable form. The disclosed apparatus also includes a calibration means which simulates the sensor output analog signal and is switchable therewith to enable end-to-end calibration of the disclosed apparatus.

17 Claims, 5 Drawing Figures

DIGITAL DATA LINK FOR TRUCK WEIGHING APPLICATIONS

FIELD OF THE INVENTION

The present invention relates in general to communication systems, and more particularly, to digital communication systems for communicating a vehicle parameter.

BACKGROUND OF THE INVENTION

Due, in part, to the weight restrictions being placed on vehicles by local, state, and federal agencies, the need to equip vehicles engaged in transporting heavy loads with a means to measure and communicate the weight of the load being carried by the vehicle has increased. This has become especially important in situations where the vehicle is adapted for both highway and off-road travel, and the load to be transported is loaded at remote off road locations where conventional weight stations are nonexistent. In the past, an apparatus measuring and communicating the weight carried by a vehicle, such as a tractor-trailer type vehicle or the like used a conventional load cell to measure the load carried by the trailer portion of the vehicle. The output of the load call was thereafter transmitted to the operator of the vehicle along an expensive and custom made cable interconnecting the load cell with the tractor portion of the vehicle. This approach has several disadvantages in that uncoupling the tractor and trailer without disconnecting the cable between same broke the cable resulting in replacement of the expensive item. In addition, if the cable were disconnected, the environment in which the vehicle was operated frequently introduced mud or the like in the ends of the cable producing inaccuracies in the apparatus.

The present invention overcomes these problems of the prior art. By using data transmitter and receiver units disposed on the trailer and tractor portions of the vehicle, the present invention measures and communicates the weight of the load to the vehicle operator along a spare wire in the reach cable interconnecting the tractor and trailer and typically provided as standard equipment by the vehicle manufacturer. The present invention alternately can communicate the weight of the load to the vehicle operator along one of the trailer lighting circuit wires. In addition, the electronic circuitry within these units enables the present invention to operate with minimal susceptability to error introduced by the effects of the environment in which the vehicle is used.

SUMMARY OF THE INVENTION

According to one aspect of the present invention, an apparatus for communicating a vehicle parameter to a location remote and apart from the parameter comprises sensor means responsive to the parameter to be communicated. The sensor means produced an output analog signal proportional to the parameter. Means periodically converts the output analog signal into a digital signal whereby the parameter to be communicated is represented by an N-bit digital code. Means transmits the digital signal to a location remote and apart from the parameter. Means periodically converts the N-bit digital code representative of the parameter into a form suitable for driving a display device. Visual display means presents in a user viewable form the converted N-bit digital code.

It is an object of the present invention to provide an apparatus accurately and quickly communicating a vehicle parameter to the operator of the vehicle.

A further object of the present invention is to provide an apparatus communicating a vehicle parameter from one point on the vehicle to another without the use of expensive cabling between the vehicle's points.

A still further object of the present invention is to provide an apparatus communicating a vehicle parameter from one point on the vehicle to another having minimal susceptibility to transmission errors introduced by the vehicle's environment.

These and other objects, features and advantages of the present invention will become more apparent in light of the detailed description of the preferred embodiment set forth hereafter, and illustrated in the accompanying drawings.

BEST MODE OF CARRYING OUT THE PRESENT INVENTION

Figure 1:
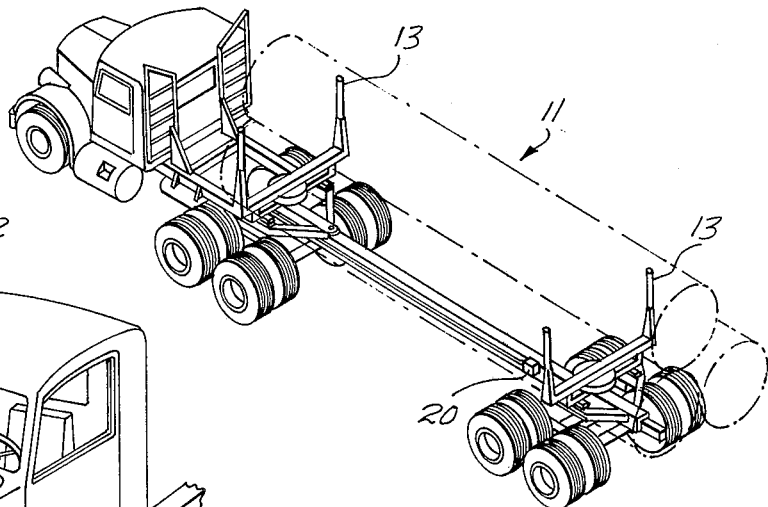
FIG. 1 is a perspective view of a vehicle showing the typical location of a data transmitter unit according to the present invention.
Figure 2:
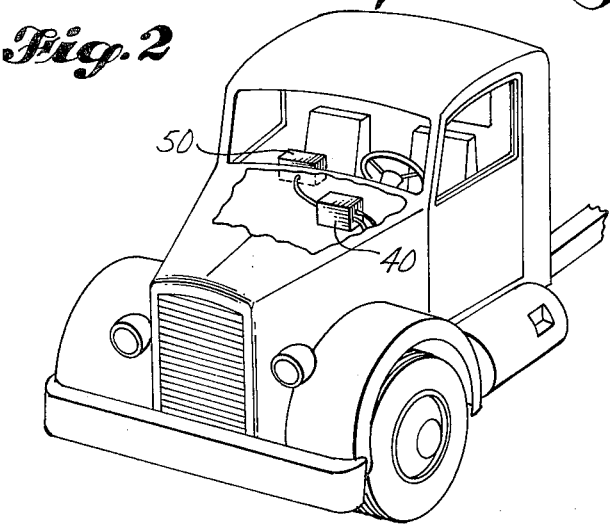
FIG. 2 is a perspective view of a vehicle with portions broken away showing the typical location of a data receiver unit according to the present invention.

With reference to FIGS. 1, 2, an apparatus for communicating a vehicle parameter from one point on the vehicle to a location remote and apart from the parameter is shown disposed at a typical location on a vehicle. For illustrative purposes, the vehicle is shown as a logging truck having a trailer portion 11 connected to and movably pulled by a tractor portion 12. As illustrated, the vehicle carries a plurality of logs with the logs coming in contact with the trailer 11 substantially at a point above the rear axles where the weight of the logs are concentrated. The logs are restrained from lateral movement both on the trailer and the tractor by a plurality of log bunks 13. The present invention comprises a data transmitting unit 20 disposed generally rearwardly on the trailer 11 in close proximity to the log bunks 13. The data transmitting unit converts an analog signal representative of the vehicle parameter to be communicated into a digital form for subsequent transmission. A data receiving unit 40 is spaced apart and remote from the data transmitting unit and is typically carried in the cab portion of the tractor 12. The data receiving unit periodically converts the digital signal representative of the vehicle parameter into a continuous analog signal. The display means 50 also carried in the tractor portion of the vehicle and generally in close proximity to the data receiving unit presents in a viewer usable form the analog signs representing the parameter. As located in its relationship to the vehicle, the present invention is ideally suited to communicate the weight of the logs carried by the trailer to the operator of the tractor. However, it is to be understood that the location of both the data transmitting unit and the data receiving unit, including the display means may be varied without departing from the teachings of the present invention. For example, the data transmitting unit may be conveniently located on the vehicle to communicate other parameters such as vehicle velocity, center of gravity or the like, while the data receiving unit may be located apart from the vehicle on a loading dock or some other central stationary location.

Figure 3:
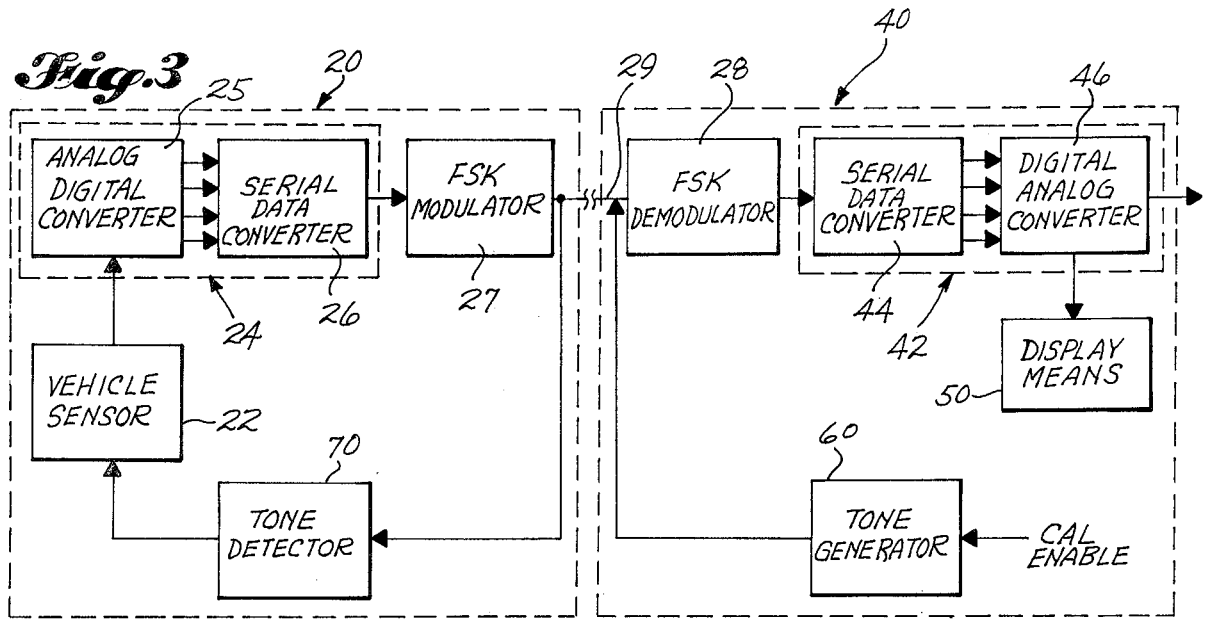
FIG. 3 is a block diagram of the present invention.

With reference to FIG. 3, the data transmitting unit of the present invention generally comprises sensor means 22 responsive to the parameter to be communicated. The sensor means produces an output analog signal proportional to the parameter to be communicated. Means, generally shown at 24, periodically converts the output analog signal produced by the sensor means into a digital signal whereby the parameter to be communicated is represented by an N-bit digital code. Means 27-29 transmits the digital signal to a location remote and apart from the parameter. The data receiving unit 40 of the present invention generally comprises a means, generally shown at 42, periodically converting the N-bit digital code representative of the vehicle parameter into a continuous signal. Visual display means 50 presents to the user in a user viewable form the continuous signal representative of the vehicle parameter. As will be discussed more fully below, the present invention also includes a means enabling a predetermined known continuous analog signal simulating the sensor means and switchable therewith to be periodically converted into a continuous digital signal thereby providing a calibration source for the invention. The means generally comprises a tone generator 60 in communication with a tone detector 70 with the tone detector being operable so that it activates a switch connecting a precise calibrating resistor across the load cell bridge terminals thereby simulating a known deflection of the load cell. These and other elements of the present invention will next be described in more detail below.

Figure 4:
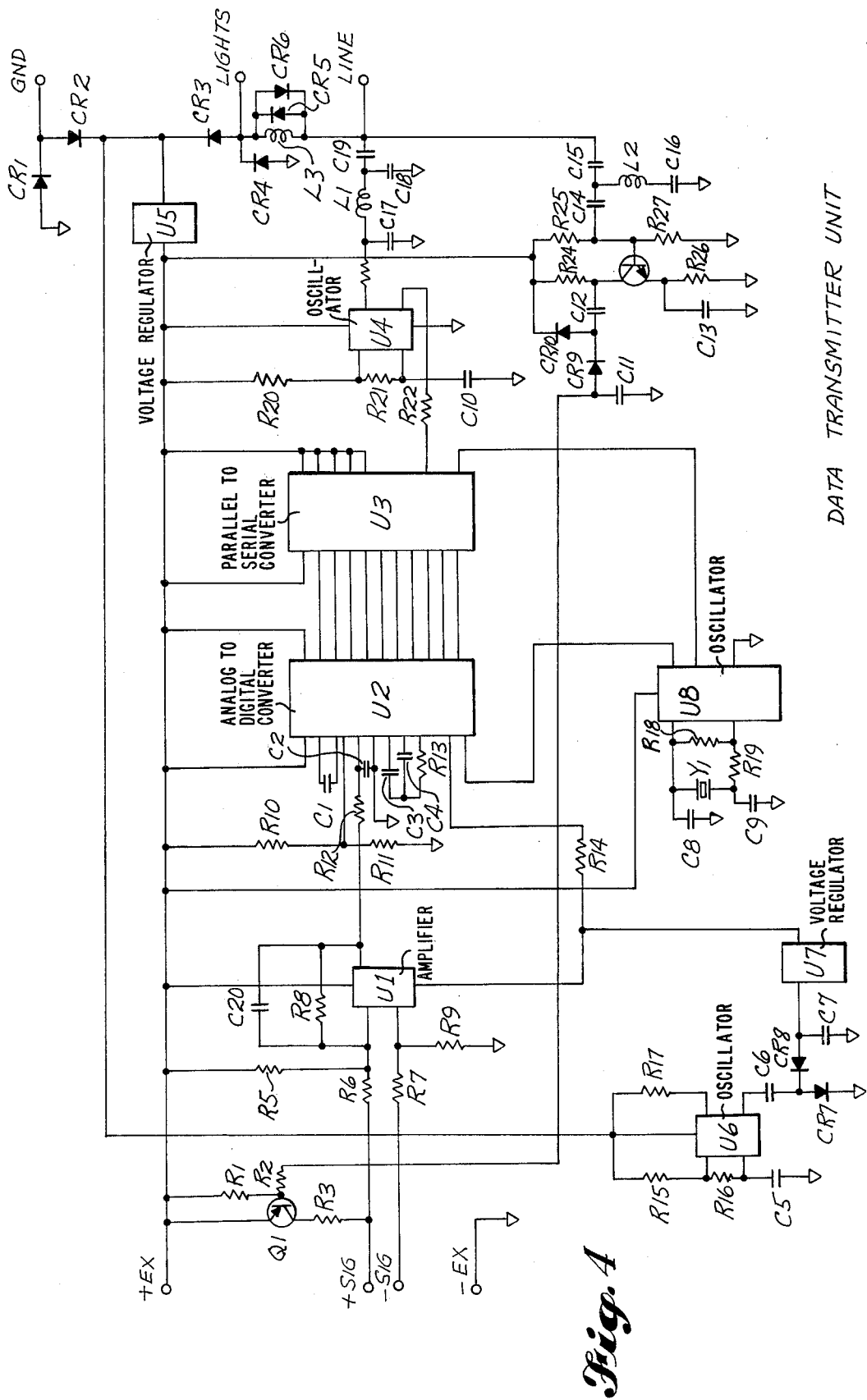
FIG. 4 is an electronic schematic diagram showing a typical data transmitter unit of the present invention.
Figure 5:
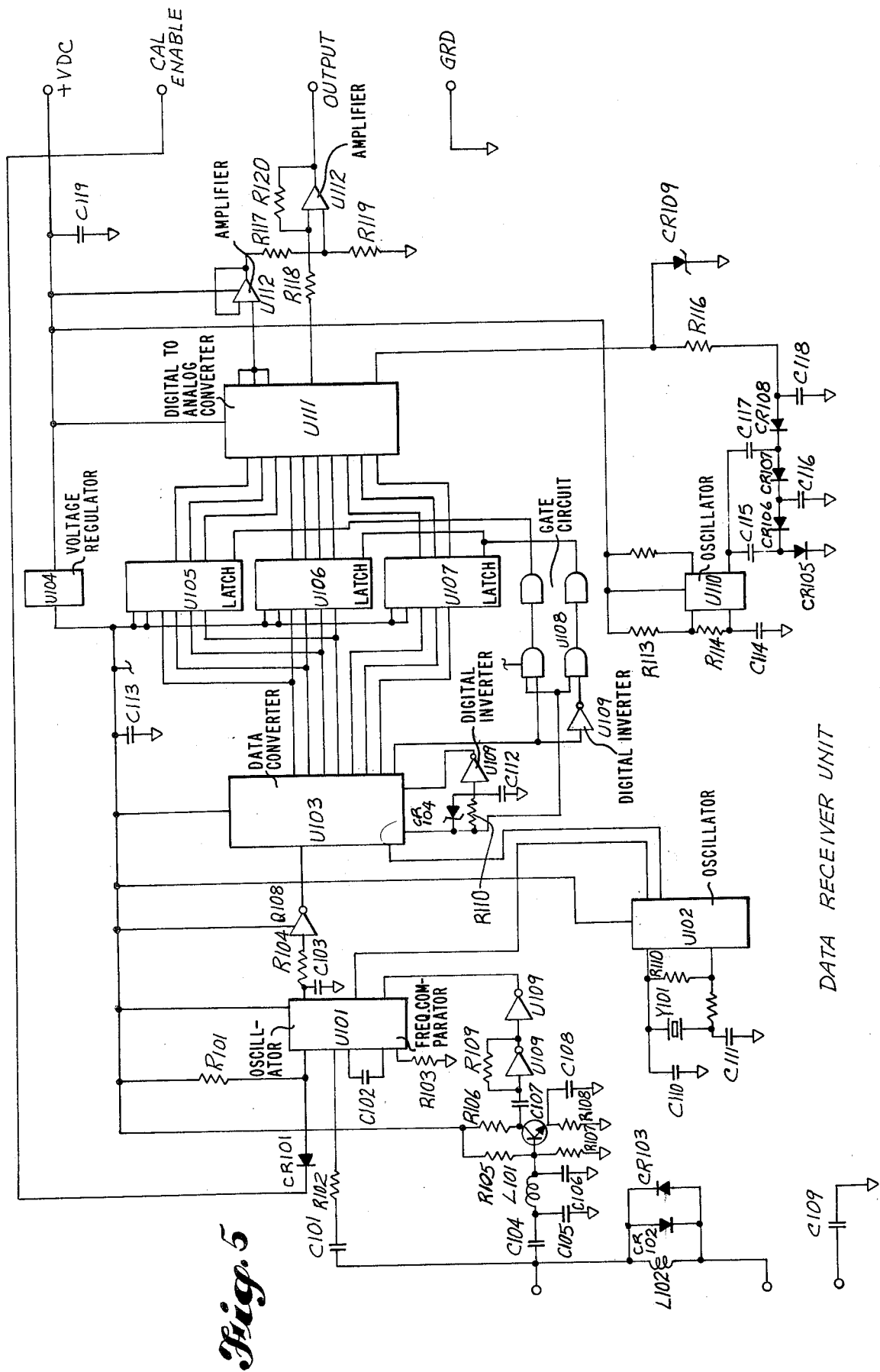
FIG. 5 is an electronic schematic diagram showing a typical data receiver unit according to the present invention.

With reference to FIGS. 3-5, the sensor means 22 typically comprises a plurality of load cells or like devices producing an output analog signal proportional to the weight of the load disposed above the load cells. By way of example, the plurality of load cells are disposed rearwardly on the trailer 11 typically directly below the point at which the weight of the load on the trailer is concentrated. Each load cell deflects responsive to the weight of the load directly above the load cell. Deflection produces an analog output signal proportional to the distance the load cell has deflected from a predetermined reference position. The output analog signals from all load cells are electrically summed by parallel connection at the transmitter unit input terminals to produce a single output analog signal representing the total deflection of the load cells. It is to be understood that although a load cell is utilized in the preferred embodiment, other sensors responsive to other vehicle parameters, such as temperature, vehicle velocity, or the like may be utilized to practice the invention without departing from the teachings of the present invention. The load cell of the preferred embodiment is a commercially available unit such as manufactured by Structural Instrumentation, Inc.

With reference to FIG. 3, means shown generally at 24 periodically converting the output analog signal produced by sensor means 22 into a continuous digital signal comprises an analog to digital converter 25 in parallel communication with a serial data converter 26. The continuous analog signal representative of the vehicle parameter is routed through a signal conditioning network comprising an operational amplifier (see FIG. 4), to the input of the analog to digital converter. Timing and control of the electronics within the data transmitter, and specifically the analog to digital converter, is provided by a crystal oscillator and frequency divider chain in conjunction with timing circuitry within the analog to digital converter. The analog to digital converter periodically samples the conditioned and continuous analog input signal and provides an N-bit digital code representative of the input. In the preferred embodiment, the analog to digital converter is of the dual slope type producing a twelve bit parallel output responsive to the analog input. In response to a periodic request from its internal timing circuitry, the analog to digital converter integrates the reference voltage for substantially 2048 clock pulses and generates a voltage ramp whose slope and end point voltage are directly proportional to the reference voltage. It thereafter connects the conditioned input analog voltage to an integrator circuit in such a way as to cause the voltage ramp to integrate each to its initial starting point. A twelve bit digital counter contained within the analog to digital converter counts the number of clock pulses required for the second integration, and the binary count produced is the digital representation of the analog input. In this manner, errors occurring as a result of a change in the reference voltage from temperature or the like are minimized. It is to be understood that although in the preferred embodiment the analog to digital converter is of the dual slope type, other types of analog to digital conversion, such as a successive approximation or the like, may be used to provide the N-bit digital output code representative of the parameter to be communicated. In the preferred embodiment, the analog to digital converter is manufactured by Intersil, Part No. ICL 7109 CPL.

The N-bit serial digital output provided by the analog to digital converter is communicated in a parallel manner to the serial data converter 26. The serial data converter is also under operational control by a crystal oscillator and frequency divider and formats or arranges the parallel output from the analog to digital converter into a plurality of digital words or bytes. Within one of the bytes, the serial data converter introduces an M-bit digital code (typically eight bits) enabling the data receiving unit 40 to convert all N-bits of the digital code representative of the parameter to be communicated into a continuous analog signal as will be more fully discussed. The serial data converter thereafter outputs the plurality of bytes containing both the N-bit digital code and the M-bit code utilized by the data receiver unit. In the preferred embodiment, the serial data converter is a commercially available integrated circuit such as a Standard Microsystems COM 8017.

The digital signal including the N-bit digital code representing the parameter to be communicated is applied directly to the means 27-29 transmitting the digital signal to a location remote and apart from the parameter. As shown in FIG. 3, the means transmitting the digital signal comprises a frequency shift keyed modulator 27 in a hardwire communication with a frequency shift keyed demodulator 28. In the preferred embodiment, the frequency shift keyed modulator typically has an output frequency range of from between 24 kHz to 40 kHz. For example, a digital signal input having a logic zero value causes the frequency shift keyed modulator to produce an analog output signal at 24 kHz, while a digital input signal having a logic one value causes the modulator to produce an analog output signal at typically 40 kHz. The output of the frequency shift keyed modulator is applied through a passive low pass filter to a hardwire link 29 physically connected between the data transmitted unit 20 and the data receiving unit 40. With reference to FIG. 1, the hardwire link 29 is of a conventional cable of the type used in automotive wiring, extending the length of the trailer 11, such as a spare wire found in the vehicle's reach cable. In an alternate embodiment, the hardwire link can be shared with one of the trailer's lighting circuit wires. In this instance, the FSK signal as well as the 200 KH₃ tone signal (see below) is biased by the voltage existing on the lighting circuit wire.

With reference to FIG. 3, the frequency shift keyed signal representing the parameter to be communicated is applied directly to the input of a frequency shift keyed demodulator 28. The demodulator comprises essentially a digital frequency-phase comparator. The frequency shift keyed input is compared with a signal of known frequency to determine if the received signal is a binary one or a binary zero. The output of the demodulator, a continuous digital signal is thereafter routed to the serial data converter.

The data receiving unit 40 includes a means periodically converting the N-bit digital code representative of the vehicle parameter into a continuous analog signal representative of the parameter. The means generally comprises a serial data converter 44 in communication with a digital to analog converter 46. The serial data converter and other electronics within the data receiver are controlled in their operation by a free running crystal oscillator in conjunction with a frequency divider (see FIG. 5). The serial data converter continually monitors the digital input signal from the demodulator to detect the presence or absence of the M-bit digital code. Upon detection of this M-bit digital code, the serial data converter subsequently applies the N-bit digital code representative of the parameter to a plurality of temporary storage registers or data latches in a parallel manner. The parallel output of each temporary storage register is applied in a parallel manner to a digital to analog converter.

The digital to analog converter 46 of the present invention comprises a resistive ladder network producing a continuous analog signal in proportion to the value of the digital signal applied to each leg of the ladder network. By electrically summing the electrical signals from each leg of the resistive ladder, the converter produces an analog signal representing the parameter communicated. In the preferred embodiment, digital to analog converter is implemented by means of an integrated circuit manufactured by Precision Monolithics No. DAC 03 CDX2. The output of the digital to analog converter is subsequently conditioned prior to routing to the display means.

In an alternate embodiment (not shown), the parallel output of each temporary storage register is applied through display drivers to a corresponding digital readout in the display means 50. In this embodiment, the output of the temporary storage registers may require additional processing, such as gain adjustment for zero crossing or the like, before being presented in user viewable form. The necessary circuitry providing this function may be separate and apart from the display means 50, or may be integral with the display means.

In an alternate embodiment of the present invention (not shown), the analog signal representative of the parameter to be communicated may be communicated to a location remote and apart from the parameter by the use of a voltage to frequency converter, and a frequency to voltage converter. In this embodiment, the analog signal from sensor means 22 is applied to a voltage to frequency converter producing a frequency modulated output signal in response to the analog voltage at its input. The frequency modulated output signal is then applied through a cable or the like to the input of a frequency to voltage converter. This converter outputs an analog voltage responsive to the frequency of the signal appearing at its input. The resulting analog signal is then applied directly to the display means 50.

Display means 50 located within the tractor portion 12 of the vehicle presents to the user in a viewable form the continuous analog signal representative of the vehicle parameter communicated. In the preferred embodiment, display means typically has a numeric readout responsive to the analog input, but it is to be understood that other forms of the display means may be utilized to practice the present invention.

The present invention includes a means enabling a predetermined and known continuous analog signal simulating the output of the sensor means 22 and switchable therewith to be periodically converted into a continuous digital signal thereby providing a calibration source for the present invention. The means comprises a tone generator 60 in communication with a tone detector 70 with the tone detector being switchably connectable to the analog to digital converter 25 input. A switch or the like on the display means is activated by the driver of the tractor. When this occurs, an oscillator within the frequency shift keyed demodulator 28 of the data receiver unit generates a tone of typically 200 kHz. The 200 kHz tone is applied directly to the hardwire link 29 connecting the data transmitter unit with the data receiver unit. The tone is additive to the data being propogated along the data link. A detector circuit within the data transmitter unit detects the presence of the 200 kHz tone, in part by a high pass filter disposed at the input of the detector circuit, and provides the requisite voltage excitation to a switching means disposed across the input of the analog to digital converter. When active, the switching means causes a known and predetermined analog signal, such as the excitation used to power the data transmitter unit, directly into a conditioning network (see FIG. 4) prior to being converted into a digital code simulating the sensor output.

With reference to FIGS. 4–5, and Tables 1 and 2 below listing the typical component valves of the present invention, the operation of the present invention will next be described for both the data transmitter unit and the data receiver unit.

DATA TRANSMITTER UNIT

Differential input signals coming from the bridge type load cell are amplified by operational amplifier U1. The gain of the amplifier is determined and set by resisters R2, R6, R7, and R9. Capacitor C20 removes high frequency noise appearing on the differential input signals. Resister R5 biases the output of amplifier U1 such that with no load applied to the load cell, the analog to digital converter input is biased to approximately twenty-five percent of this full-scale range. The analog to digital conversion process is performed by component U2. The reference voltage for U2 is supplied through a voltage divider comprising resistors R10 and R11. Resister R12 and capacitor C2 filter input noise appearing on the reference voltage. Resister R13 and capacitor C3 establish integrator and constants for the analog to digital convertor. Capacitor C4 stores the analog digital converter's auto-zero cycle voltage.

Component U3 is a universal asynchronis receiver and transmitter circuit which converts the parallel digital output of the analog to digital converter into a serial code. Timing and clock signals for the analog to digital converter and the universal asynchronis receiver/transmitter circuit are provided by an oscillator/divider circuit shown at U8. An oscillator Y1 provides a master clock frequency of substantially 32.768 kHz. The output of U3 is coupled through resister R22 through a voltage control oscillator U4, which generates frequency shift keyed (FSK) signals with a 40 kHz mark frequency in a 24 kHz space frequency. These frequencies are determined and set by resisters R20 through R22, and capacitor C10. The FSK signal is filtered by a low pass filter comprised of elements C17, C18, and routed through a coupling capacitor C19 to the input line. Component L3 decouples the input line for the data transmission frequency and allows them to be superimposed on the DC power. The output side of L3 is connected to a terminal that may be used to receive the power for external lighting circuit purposes. Capacitors C6 and C7 are used to suppress any switching transients.

A diode bridge comprising diodes CR1 through CR4 selects power of the appropriate polarity for the data transmitter unit circuits. Regulator circuit U5 supplies the positive DC voltage. Oscillator U6 and a rectifier circuit, comprising diodes CR7 through CR8, form a DC/DC voltage converter circuit used to generate a negative supply for the data transmitter unit. Regulator U7 regulates the negative voltage to a controlled negative DC value.

The calibration function is performed by shunting a calibration resister R3 across the load cell input. This is done by an electronic switch comprising a transistor Q1 which is activated when a 200 kHz tone is detected by the detector circuit comprising diodes CR9, CR10 and capacitor C11. The 200 kHz tone is picked off the input line by a high pass filter comprising capacitor C14 through C16, and the inductor L2. The output of the filter is amplified by amplifier Q2.

DATA RECEIVER UNIT

Input data is picked off the power line by capacitor C104 and applied through a low pass filter comprising inductor L101, and capacitor C105 through C106. The input data is amplified by amplifier Q101. The input signal is squared up by a digital inverter U109 and subsequently applied to the input of the frequency comparator section of component U101. A reference frequency input for U101 is provided by an oscillator U102 whose output frequency is substantially 32.768 kHz. The frequency comparator in U1 determines if the FSK input signal is either above or below the reference frequency, and outputs a logic one or a logic zero for a mark or a space, respectively. The output of U1 is buffered by a digital inverter and applied to the serial data input of data converter U103.

Data converter U103 converts the serial data stream at its input into a parallel binary data source. Because the data being received is contained in more than one byte, the output of the data converter is stored in a plurality of latches comprised of components U105 through U107. Gate circuit U108 picks off the byte identification bit contained in the received data strain, and combines it with a strobe signal from the data converter U103. The gate unit further generates control signals at low data into the latches.

Component U111 is a digital to analog converter. Operational amplifier U112 inverts the output of the digital to analog converter and adjusts its slope and bias point.

A five volt DC power supply for the logic circuit and the data receiver unit is supplied by a regulator circuit U104. The necessary negative voltage for the data receiver unit is generated by an oscillator circuit comprising component U110, and a voltage doubler circuit comprising diodes CR105 through CR108, and capacitor C115 through C118. The voltage is regulated to a minus 12 volts by diode CR109 and resistor R116. Inductor L102 together with transient suppressors CR102 through CR102 provide isolation between the DC power and the frequency used for data transmission.

The 200 kHz tone used to operate the calibration circuit is generated by the oscillator section of component U101. Its frequency is determined by capacitor C102 and resistor R103. The oscillator is switched by grounding the CAL ENABLE line. Its output is coupled into the output line through capacitor C101 and resistor R102.

TABLE 1

| TYPICAL COMPONENTS FOR DATA TRANSMITTER UNIT | |
|---|---|
| Reference Designation | Description |
| R14, 23 | 330 ohm, 5%, ¼ Watt |
| R27 | 1,5K ohm, 5%, ¼ Watt |
| R24, 26 | 4.7K ohm, 5%, ¼ Watt |
| R20 | 4.1K ohm, 5%, ¼ Watt |
| R22, 16 | 10K ohm, 5%, ¼ Watt |
| R21 | 18K ohm, 5%, ¼ Watt |
| R13, 1, 2 | 22K ohm, 5%, ¼ Watt |
| R17 | 100K ohm, 5%, ¼ Watt |
| R12, 19 | 470K ohm, 5%, ¼ Watt |
| R18 | 22 Meg. ohm, 5%, ¼ Watt |
| R11, 15, 25 | 2200 ohm, 1% |
| R6, 7 | 3650 ohm, 1% |
| R3, 8, 9, 10 | 51.1K ohm, 1% |
| R5 | 2.2 Meg. ohm, 1% |
| C1 | 1 µf. 16 v. |
| C6, 7 | 10 µf. 16 v. |
| C8 | 10 pf. |
| C9 | 22 pf. |
| C14, 15 | 680 pf. |
| C17, 18 | 6800 pf. |
| C10 | 1000 pf. |
| C5, 11, 12, 13 | .01 disc |
| C2, 16 | .01 µf film |
| C3 | .15 µf film |
| C4 | .33 µf film |
| C19, 20 | .1 µf disc |
| U1 | OP-05CP |
| U2 | 1CL7109CPL |
| U3 | COM 8017 |
| U4, 6 | LM 555 |
| U5 | 78L05 |
| U7 | 79L05 |
| U8 | CD4060A |
| CR1-4 | MDA 100 |
| CR 5, 6 | 1N4001 |
| CR7-10 | 1N4148 |
| Q1 | 2N3640 |
| Q2 | 2N3563 |
| Y1 | 32.768 kHz. crystal |
| L2 | 1 mhy |
| L1 | 2.7 mhy |
| L3 | 500 µhy. |

TABLE 2
TYPICAL COMPONENTS FOR DATA RECEIVER UNIT

| Reference Designation | Description |
| --- | --- |
| R116 | 330 ohm, ¼ Watt, 5% |
| R107 | 1.5K ohm, ¼ Watt, 5% |
| R106, 108 | 4.7K ohm, ¼ Watt, 5% |
| R103, 114 | 10K ohm, ¼ Watt, 5% |
| R101, 104, 112 | 100K ohm, ¼ Watt, 5% |
| R111 | 470K ohm, ¼ Watt, 5% |
| R109 | 10M. ohm, ¼ Watt, 5% |
| R110 | 22M. ohm, ¼ Watt, 5% |
| R102, 105, 113 | 2.2K 1% |
| R119 | 46.4K 1% |
| R115, 117, 118 | 51.1K 1% |
| C113, 115–118 | 10 µf. 16 v. |
| C119 | 150 µf. 25 v. |
| C107, 108, 112, 114 | .01 µf. disc. |
| C101, 104, 109 | .1 µf. disc. |
| C110 | 10 pf. |
| C111 | 22 pf. |
| C103 | 220 pf. |
| C102 | 390 pf. |
| C105, 106 | .01 film |
| L101 | 3.6 mhy |
| L102 | 500 µhy |
| Y101 | 32.768 KHz crystal |
| CR101, 104–108 | 1N4148 |
| CR102, 103 | 1N4001 |
| CR109 | 1N759 |
| U101 | CD4046B |
| U102 | CD4060A |
| U103 | COM8017 |
| U104 | 78L05 |
| U105–107 | CD4042B |
| U108 | 74C00 |
| U109 | CD4069B |
| U110 | LM555 |
| U111 | DAC 03 CDX 2 |
| U112 | LM 747 |
| Q101 | 2N3563 |

What is claimed is:

1. An apparatus for communicating a vehicle parameter to another location on the vehicle remote and apart from where the vehicle parameter is measured comprising:
   (a) sensor means responsive to the vehicle parameter being measured and producing an output analog signal proportional to the vehicle parameter;
   (b) means periodically converting said output analog signal into a digital signal whereby the vehicle parameter being measured is represented by an N-bit digital code;
   (c) calibration means simulating said sensor means output analog signal and switchable to said means periodically converting said analog signal into a digital signal thereby providing calibration for the apparatus;
   (d) a transmitter in communication with a demodulator by means of a hardwire link constituting a portion of the vehicle's existing wiring, said transmitter transmitting said N-bit digital code from means for periodically converting said analog signal into a digital signal through said existing vehicle wiring to said demodulator which receives said digital code;
   (e) means periodically converting said N-bit digital code representative of the vehicle parameter received by said demodulator into a continuous analog signal representative of the vehicle parameter; and,
   (f) visual display means whereby the continuous signal representative of the vehicle parameter is displayed in a user viewable form.

2. The apparatus of claim 1 wherein said digital signal further includes an M-bit digital code enabling said means periodically converting said N-bit digital code to a continuous analog signal representative of the vehicle parameter to convert all N-bits of said code to such a continuous analog signal.

3. The apparatus of claim 1 wherein said transmitter comprises a frequency shift keyed modulator, and said demodulator comprises a frequency shift keyed demodulator.

4. The apparatus of claim 3 wherein the hardwire communication between said frequency shift keyed modulator and said frequency shift keyed demodulator comprises one of the vehicle's lighting circuit wires.

5. The apparatus of claim 3 wherein the frequency of said frequency shift keyed modulator ranges from between 24 kHz to 40 kHz.

6. The apparatus of claim 1 wherein said N-bit digital code has twelve bits.

7. The apparatus of claim 1 wherein said calibration means comprises a tone generator in communication with a tone detector with said tone detector being switchably connectable to said means periodically converting said output analog signal into a digital signal.

8. The apparatus of claim 7 wherein said tone generator has a tone output of substantially 200 kHz.

9. The apparatus of claim 1 wherein said means periodically converting said output analog signal into a digital signal comprises an analog-to-digital converter which produces an N-bit digital code representative of the vehicle parameter by comparing said output analog signal proportional to the vehicle parameter with a ramp voltage formed by integrating a reference voltage for a predetermined period of time.

10. An apparatus for communicating a continuous electrical signal representing a vehicle parameter to a location remote and apart from where the vehicle parameter is measured, the said apparatus comprising:
   (a) means periodically converting the continuous electrical signal into an N-bit digital code representative of the vehicle parameter;
   (b) means converting said N-bit digital code to an M-bit digital code and said means further outputting a digital signal therefrom;
   (c) a transmitter in communication with a demodulator by a hardwire link disposed along the length of the vehicle, the hardwire link being a portion of the vehicle's existing wiring, said transmitter transmitting said digital signal through said existing wiring to said demodulator disposed at a location remote from where the vehicle parameter was measured;
   (d) means periodically converting said M-bit digital code representative of the vehicle parameter received by said demodulator into a continuous signal representative of the vehicle parameter;
   (e) visual display means whereby the continuous signal representative of the vehicle parameter is displayed in a user viewable form; and,
   (f) means enabling a predetermined and known continuous analog signal simulating the electrical signal representing the vehicle parameter to be measured and switchable therewith to be periodically converted into an additional signal thereby providing calibration for the apparatus.

11. The apparatus of claim 10 wherein said transmitter comprises a frequency shift keyed modulator, and said modulator comprises a frequency shift keyed demodulator.

12. The apparatus of claim 11 wherein the hardwire communication between said frequency shift keyed modulator and said frequency shift keyed demodulator comprises one of the vehicle's lighting circuit wires.

13. The apparatus of claim 11 wherein the frequency of said frequency shift keyed modulator ranges from between 24 kHz to 40 kHz.

14. The apparatus of claim 10 wherein said N-bit digital code has twelve bits.

15. The apparatus of 10 wherein said means enabling a predetermined and known continuous analog signal simulating the electrical signal representing the vehicle parameter to be measured comprises a tone generator in communication with a tone detector with said tone detector being switchably connectable to said means periodically converting said electrical signal.

16. The apparatus of claim 15 wherein said tone generator has a tone output of substantially 200 kHz.

17. The apparatus of claim 10 wherein said means periodically converting said continuous electrical signal includes an analog-to-digital converter producing an N-bit digital code representative of the parameter by comparing said continuous electrical signal representing a vehicle parameter with a ramp voltage formed by integrating a reference voltage for a predetermined period of time.

* * * * *

UNITED STATES PATENT AND TRADEMARK OFFICE
CERTIFICATE OF CORRECTION

PATENT NO. : 4,328,494

DATED : May 4, 1982

INVENTOR(S) : Richard Goodall

It is certified that error appears in the above—identified patent and that said Letters Patent is hereby corrected as shown below:

Column 6, line 66, "this" should read -- its --.

Signed and Sealed this

Fifth Day of October 1982

[SEAL]

Attest:

Attesting Officer

GERALD J. MOSSINGHOFF

Commissioner of Patents and Trademarks